United States Patent [19]
Revilla et al.

[11] Patent Number: 5,926,831
[45] Date of Patent: *Jul. 20, 1999

[54] METHODS AND APPARATUS FOR CONTROL OF SPECULATIVE MEMORY ACCESSES

[75] Inventors: Juan Guillermo Revilla, Cary; Thomas Andrew Sartorius, Raleigh; Mark Michael Schaffer, Cary; James N. Dieffenderfer, Apex, all of N.C.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/731,350

[22] Filed: Oct. 11, 1996

[51] Int. Cl.$^6$ .................................................. G06F 12/08
[52] U.S. Cl. ............................................................ 711/137
[58] Field of Search .................................. 711/118, 137, 711/213; 395/383

[56] References Cited

U.S. PATENT DOCUMENTS

| | | | |
|---|---|---|---|
| 4,086,629 | 4/1978 | Desyllas et al. | 711/213 |
| 4,928,239 | 5/1990 | Baum et al. | 711/136 |
| 5,603,010 | 2/1997 | Dodd et al. | 711/167 |
| 5,717,931 | 2/1998 | Sapir et al. | 395/728 |
| 5,761,708 | 6/1998 | Cherabuddi et al. | 711/118 |
| 5,860,107 | 1/1999 | Patel | 711/140 |

OTHER PUBLICATIONS

Motorola, "PowerPC 603 RISC Microprocessor User's Manual", 1994, P 5–10 to 5–14.

*Primary Examiner*—Eddie P. Chan
*Assistant Examiner*—Kevin L. Ellis
*Attorney, Agent, or Firm*—Daniel E. McConnell; Steven B. Phillips; Myers Bigel Sibley & Sajovec, LLP

[57] ABSTRACT

A dynamically configured memory controller to prevent speculative memory accesses of non-well behaved memory. Such dynamic configuration of a memory controller may be accomplished by providing to the memory controller guard information associated with memory requests. The memory controller may then prevent speculative memory accesses when the guard information indicates that the memory requests are of non-well behaved memory. The guard information provided to the memory controller may include guard information associated with each memory request provided to the memory controller.

10 Claims, 3 Drawing Sheets

METHODS AND APPARATUS FOR CONTROL OF SPECULATIVE MEMORY ACCESSES

FIELD OF THE INVENTION

The present invention relates generally to memory interfaces. More particularly the present invention relates to speculative memory accesses.

BACKGROUND OF THE INVENTION

Because of latency problems with memory accesses, various techniques have been developed to increase the performance of memory read operations. One such technique is known as speculative memory accesses. A speculative memory access is a memory access, not of the data requested by a read operation, but of the data which it is believed may be requested later based upon a current read operation. For example, when a processor requests an instruction from memory it is very likely that the processor will request the next consecutive address or block of addresses in memory as well. Accordingly, a speculative memory access may be executed which retrieves, along with the requested data, the next consecutive data, and stores that data in a buffer to be provided to the processor. Such a speculative memory access can have substantial benefits in increasing performance of a memory system.

As processing systems have evolved, they have often included a number of general purpose and custom designed discrete devices which make up the processing system. These systems typically included a processor and a memory controller. The processor would be a general purpose processor which may be used in a wide variety of systems, but the memory controller was typically custom designed for a particular hardware configuration. In other words, the memory controller in these systems was built with information about the memory structure of the processing system including the acceptable memory addresses and the addresses of any memory mapped input/output ("I/O") devices.

Such systems typically include both well behaved and non-well behaved memory or memory-mapped I/O devices. Well behaved memory is memory, such as RAM or ROM, which when accessed by a read operation multiple times will always provide the same data, until that data is changed by a write operation. Non-well behaved memory is memory which is affected by a read operation or otherwise provides unpredictable results. Examples of non-well behaved memory include First-In First-Out (FIFO) buffers or status registers which automatically change their contents or reset upon being read. For such non-well behaved locations a speculative access could cause the loss of data and/or the delivery of incorrect data if the processor did not intend for the speculatively-accessed location to be accessed yet. Thus, speculative memory accesses must be controlled in a memory environment which includes non-well behaved memory. As used herein, the term "memory" refers to any device from which data may be read and wherein the device is accessed by an address associated with the data to be read.

The processor's in these systems typically have a Memory Management Unit (MMU) function which provides control over whether the processor will make a speculative request to the memory controller. This is accomplished with an MMU which allows the specification of whether each region of memory is well behaved or not. If a region is marked as being well behaved, then the processor may make speculative requests to that region (as well as normal, non-speculative requests). If a region is marked as being non-well behaved then the processor will avoid making speculative requests to that region, and will only make requests that are non-speculative.

Once the processor has decided to make a request, the memory controller may further decide to speculatively access additional data, beyond what was requested by the processor. Again, the problem is the avoidance of the speculative portion of the access if the region being accessed is non-well behaved. Typically, a custom designed memory controller is provided in the discrete system to statically avoid making any speculative access beyond the data which was explicitly requested by the processor. This has been accomplished via built-in "knowledge", within the hardware of the memory controller, of those regions in the system which are non-well behaved. Thus, a custom-designed discrete memory controller device for a predefined system can be designed to avoid making speculative accesses to non-well behaved memory locations and thus avoid losing information or corrupting data.

However, as processing systems have become more and more integrated it has become desirable to incorporate a memory controller and a processor in a single integrated circuit. The integration of the memory controller with the processor can greatly improve the overall performance of the processing system. However, such a general purpose integrated device may be used in any number of systems with varying addresses for non-well behaved locations. The memory controller of the integrated device is difficult to effectively custom-design for each implementation of memory with which it may be used. In such an integrated memory controller, it is no longer possible to build-in knowledge of these varying memory systems, as a means of avoiding speculative access to non-well behaved memory locations.

In view of the above discussion, there exists a need for further advancement in the control of speculative memory accesses and, in particular, for advancements in the control of speculative memory accesses in general purpose integrated devices.

OBJECTS AND SUMMARY OF THE INVENTION

In view of the above it is one object of the present invention to provide for the control of speculative memory accesses to avoid inadvertent accesses of non-well behaved locations without sacrificing processing power.

A further object of the present invention is to provide for control of speculative memory accesses which is suitable for use in a wide variety of memory environments.

Yet another object of the present invention is to provide for control of speculative memory accesses which is suitable for use in an integrated device having a memory controller and a processor.

These and other objects of the present invention are provided by dynamically configuring a memory controller to prevent speculative memory accesses of non-well behaved memory. Such dynamic configuration of a memory controller may be accomplished by providing to the memory controller guard information associated with memory requests. The memory controller may then prevent speculative memory accesses when the guard information indicates that the memory requests are of non-well behaved memory. The guard information provided to the memory controller may include guard information associated with each memory request provided to the memory controller.

By providing for dynamic reconfiguration of a memory controller to prevent speculative accesses of non-well behaved memory a memory controller may generate the speculative memory accesses without having to be specially designed for a processing system. Furthermore, the memory controller may be readily incorporated in an integrated device with a processor for general purpose use because the memory controller may be reconfigured based upon the particular memory structure in which the device is placed. Thus, a dynamically reconfigurable memory controller may initiate speculative requests to well behaved locations while avoiding non-well behaved locations.

In an alternative embodiment of the present invention a dynamically reconfigurable memory controller is provided which includes access request receiving means for receiving memory access requests and means for receiving guard information indicating whether an access request received by the access request receiving means requests an access of non-well behaved memory. The memory controller further includes means for generating a memory access in response to the access request receiving means and means for generating speculative memory accesses responsive to the means for receiving guard information and the means for generating a memory access. The means for generating speculative memory accesses generates a speculative memory access based upon access requests received by the access request receiving means and prevents speculative memory accesses when the means for receiving guard information receives guard information indicating a request requests access of non-well behaved memory.

A data processing system is also provided which includes a data processor and a memory controller for accessing well-behaved and non-well-behaved data based upon access requests received from the data processor. The memory controller is capable of selectively causing speculative accesses of the data based upon guard information received from the data processor. The data processing system may further include well behaved memory and non-well behaved memory mapped input/output devices. The well behaved memory and the non-well behaved memory mapped input/output devices are then accessed by the data processor through the memory controller.

In one embodiment of the data processing system the memory controller receives guard information associated with access requests received from the processor. The memory controller prevents speculative memory accesses when the guard information indicates that the access request is of non-well behaved memory. Preferably, the data processor provides to the memory controller guard information associated with each access request provided to the memory controller.

In a preferred embodiment of the present invention the data processor and the memory controller are in a single integrated circuit.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method or data processing system. Accordingly, the present invention may take the form of an entirely hardware embodiment, an entirely software embodiment or an embodiment combining software and hardware aspects.

Figure 1:
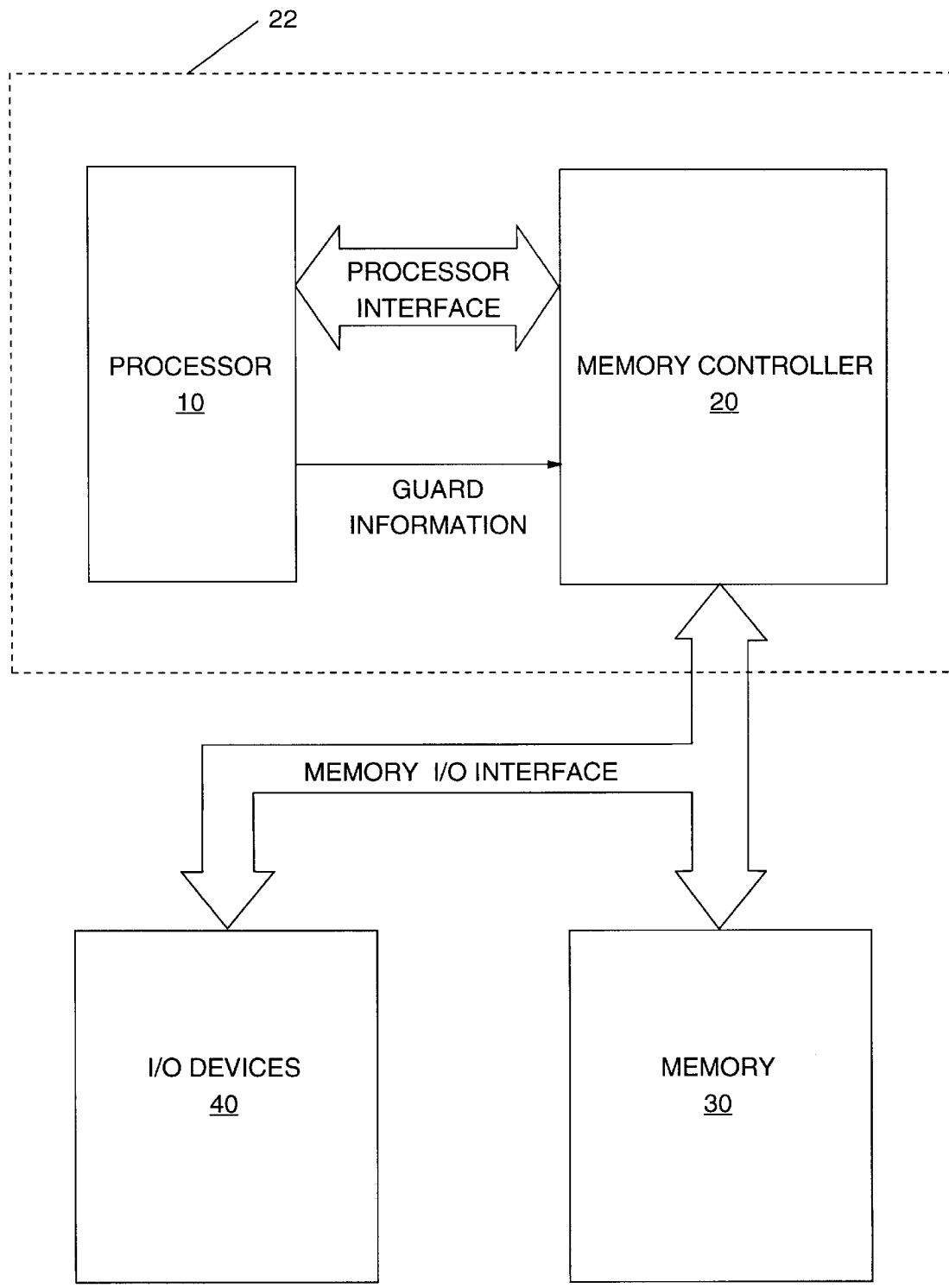
FIG. 1 is a block diagram of a system utilizing the present invention.

FIG. 1 illustrates one embodiment of the present invention. As seen in FIG. 1, a processor 10 communicates with a memory controller 20 over a processor interface. One such processor interface suitable for use with the present invention is the interface described in concurrently filed and commonly assigned United States Patent Application entitled METHOD AND ARCHITECTURE FOR OVERLAPPED READ AND WRITE OPERATIONS, the disclosure of which is incorporated herein by reference as if set forth fully. While the above interface is preferred, as will be appreciated by those of skill in the art, any suitable interface for communicating at least a read operation to a memory controller may be utilized.

The memory controller 20 and the processor 10 are preferably in a single integrated circuit 22. The memory controller 20 communicates with external devices by means of a memory I/O interface. Any number of suitable memory I/O interfaces are known to those of skill in the art and may be utilized with the present invention. Furthermore, the interface described above may be utilized. Devices connected to the memory controller 20 may include memory 30 and/or input/output (I/O) devices 40. Additionally, other devices having a memory-mapped access implementation such as are known to those of skill in the art may also be connected to the memory controller 20. The memory 30 and the I/O devices 40 illustrate both well behaved and non-well behaved devices. Thus, for example, an I/O device 40 may include a first-in first-out buffer which when accessed by a speculative memory access would lose data when a specific memory access is directed to the buffer.

The processor 10 may be a general purpose processor or a dedicated or custom designed processor. The memory controller 20 receives access requests of memory mapped devices such as the input/output (I/O) devices 40 or the memory 30 and passes those access requests to the appropriate device. The memory controller 20 also initiates speculative accesses of locations based upon the access requests received from the processor 10. The memory controller 20 selectively generates speculative accesses based upon guard information which is provided by the processor 10 to the memory controller 20.

Guard information may take the form of a guard bit transferred to the memory controller 20 with each access request sent to the memory controller 20. The memory controller 20 receives the guard information from the processor 10 and, if the guard information indicates that a speculative memory access may occur, generates the speculative accesses. However, if the guard information indicates that a speculative access should not occur, no additional accesses are generated. The presentation of guard information allows memory controller 20 to be dynamically configured to prevent speculative accesses of non-well behaved locations. Thus, the memory controller 20 of the present invention may be utilized in a wide variety of memory configurations making the memory controller 20 suitable for integration into a general purpose processor.

Operation of the present invention will now be described with reference to the flowchart of FIG. 2. It will be understood that certain blocks of the flowchart illustration, and combinations of blocks in the flowchart illustration, can be implemented by computer program instructions. These computer program instructions may be loaded onto a computer or other programmable data processing apparatus to produce a machine, such that the instructions which execute on the computer or other programmable data processing apparatus create means for implementing the functions specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or combinations of special purpose hardware and computer instructions.

Figure 2:
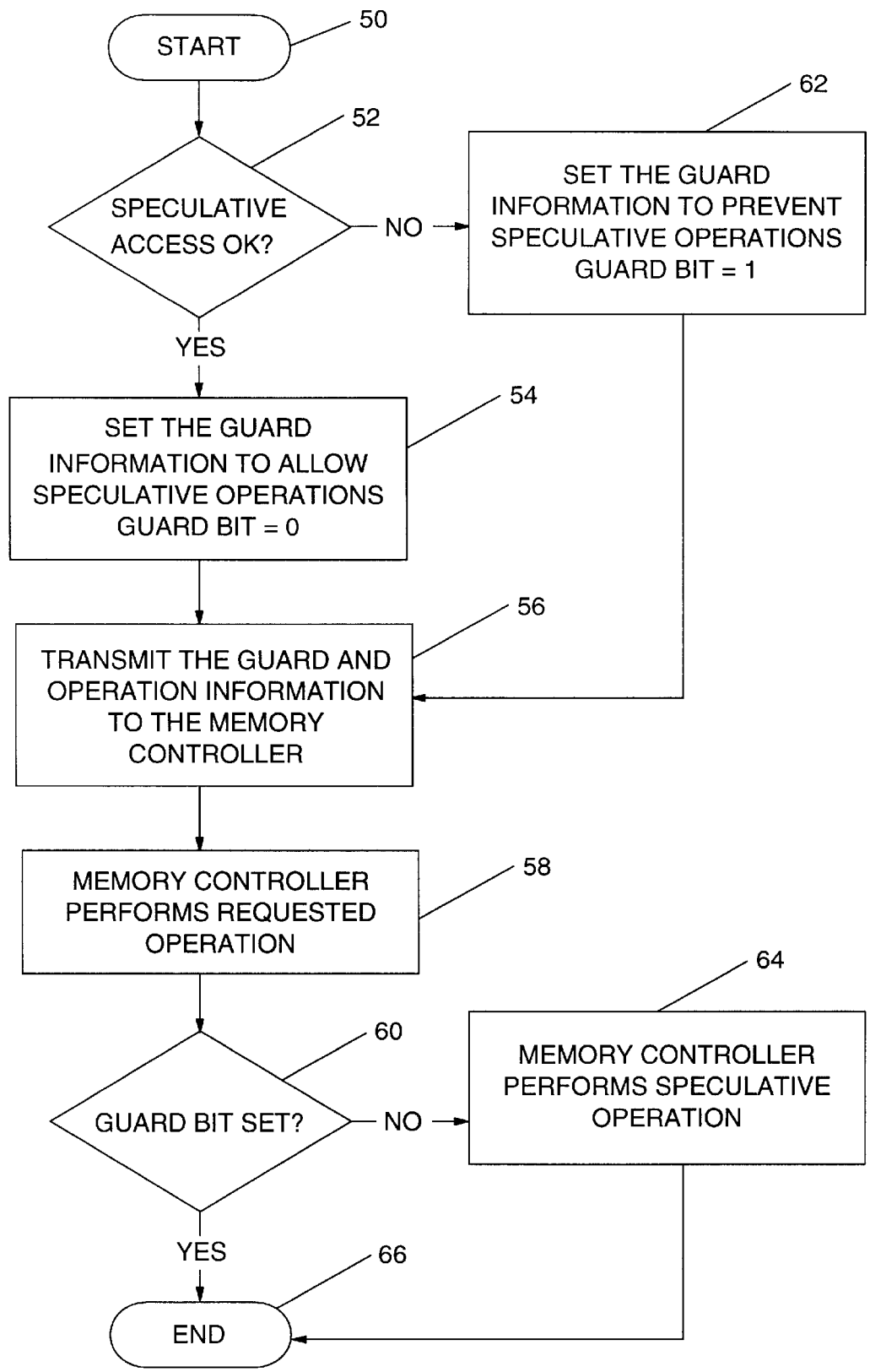
FIG. 2 is flow chart illustrating the operation of a system according to the present invention.

FIG. 2 illustrates the preferred embodiment of the present invention where guard information is provided by the processor 10 to the memory controller 20 with each access request. As seen in FIG. 2, an access begins by the processor 10 determining if speculative accesses are acceptable for the access request (blocks 50 and 52). If speculative accesses are acceptable, the processor 10 sets a guard bit to "0" to allow speculative accesses by the memory controller 20 (block 54). If speculative accesses are not acceptable, then the processor 10 sets the guard bit to "1" to prevent speculative accesses by the memory controller 20 (block 62). The processor 10 then transmits the guard bit and the access information to the memory controller 20 (block 58).

The memory controller 20 receives the information defining the access and the guard bit and carries out the access requested (block 58). The memory controller 20 evaluates the guard bit to determine if it is set to a "1" to prevent speculative accesses (block 60). If the guard bit is not set to a "1" the memory controller 20 performs a predefined speculative access to "prefetch" information which may be requested by the processor 10 (block 64) and the operation is complete (block 66). If the guard bit is set to "1" the memory controller 20 does not perform the speculative access and the operation is complete when the requested access is completed.

Figure 3:
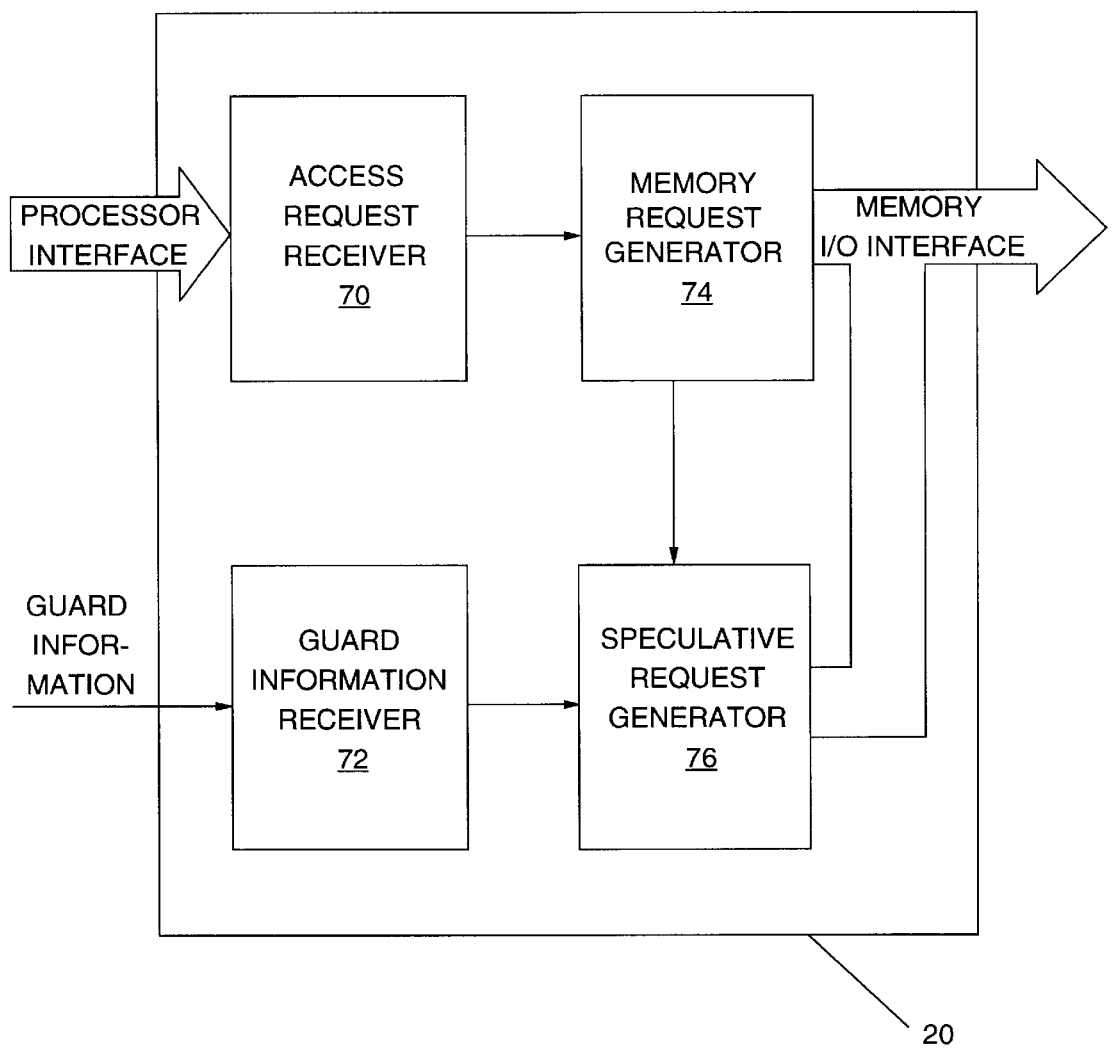
FIG. 3 is a block diagram of a memory controller according to the present invention.

FIG. 3 illustrates one embodiment of a memory controller 20 according to the present invention. As seen in FIG. 3, receiver circuitry forms an access request receiver 70 which receives access requests from the processor 10 over the processor interface. These requests are passed to the memory request generator 74 which generates the corresponding access on the memory I/O interface of the devices attached to that interface, such as the memory 30 and the I/O devices 40. The memory controller 20 also includes receiver circuitry to provide a guard information receiver 72 which receives the guard information from the processor 10. A speculative request generator 76 is also provided which generates speculative requests on the memory I/O interface of the devices attached to that interface, such as the memory 30 and the I/O devices 40.

The speculative request generator 76 receives information regarding the access request from the processor interface from the memory request generator 74 so as to determine the locations for speculative accesses generated by the speculative request generator 76. The speculative request generator also receives guard information from the guard information receiver 72 which enables or disables speculative accesses as described above.

As will be appreciated by those of skill in the art, the present invention may be implemented in various other levels of the memory hierarchy. For example the guard information could be provided to a cache controller or other such controller which may make automatic speculative accesses to prevent speculative accesses of non-well behaved locations.

In the drawings, specification and examples, there have been disclosed typical preferred embodiments of the invention and, although specific terms are employed, these terms are used in a generic and descriptive sense only and not for purposes of limitation, the scope of the invention being set forth in the following claims.

That which is claimed is:

1. A method of controlling speculative memory accesses by a memory controller separate from a processor, the method comprising:

transmitting a memory access request from the processor;

transmitting guard information indicating whether an access request requests an access of non-well-behaved memory which is characterized by at least one of the non-well-behaved memory being affected by a read operation and the non-well-behaved memory providing unpredictable results in response to a read operation;

receiving the memory access request at the memory controller;

receiving the guard information at the memory controller; and dynamically configuring the memory controller to prevent speculative memory accesses of the non-well-behaved memory which is characterized by at least one of the non-well-behaved memory being affected by a read operation and the non-well-behaved memory providing unpredictable results in response to the received memory access request and the received guard information so as to reduce the amount of data accessed in response to a memory access request.

2. The method according to claim 1, wherein said step of dynamically configuring comprises the steps of:

providing to the memory controller guard information associated with memory requests;

preventing speculative memory accesses when the guard information indicates that the memory requests are of non-well behaved memory.

3. The method according to claim 2, wherein said step of providing to the memory controller guard information comprises providing to the memory controller guard information associated with each memory request provided to said memory controller.

4. A data processing system comprising:

a data processor comprising:

means for transmitting memory access requests; and means for transmitting guard information indicating whether an access request transmitted by said means for transmitting memory access requests requests an access of non-well-behaved memory which is characterized by at least one of the non-well-behaved memory being affected by a read operation and the non-well-behaved memory providing unpredictable results in response to a read operation; and a dynamically reconfigurable memory controller comprising:

access request receiving means for receiving memory access requests from said means for transmitting memory access requests;

means for receiving said guard information indicating whether an access request received by said access request receiving means requests an access of non-well-behaved memory which is characterized by at least one of the non-well-behaved memory being affected by a read operation and the non-well-behaved memory providing unpredictable results in response to a read operation, from said means for transmitting guard information;

means for automatically generating a memory access in response to said access request receiving means; and means for generating speculative memory accesses responsive to said means for receiving guard information and said means for generating a memory access, for automatically generating speculative memory accesses based upon access requests from said processor received by said access request receiving means and for preventing speculative memory accesses to thereby reduce the amount of data accessed in response to a memory access request when said means for receiving guard information receives guard information indicating a request requests access of non-well-behaved memory.

5. The dynamically reconfigurable memory controller of claim 4, wherein said means for receiving guard information receives guard information associated with each access request received by said access request receiving means.

6. A data processing system comprising:

a data processor that transmits memory access requests and that transmits guard information indicating whether an access request transmitted by said data processor requests an access of non-well-behaved memory which is characterized by at least one of the non-well-behaved memory being affected by a read operation and the non-well-behaved memory providing unpredictable results in response to a read operation; and a memory controller that automatically accesses said well-behaved and non-well-behaved data, which is data characterized by at least one of the non-well-behaved data being affected by a read operation and the non-well-behaved data being unpredictable results in response to a read operation, based upon access requests received by said memory controller from said data processor, said memory controller being capable of selectively causing speculative accesses of said data based upon guard information received from said data processor to limit the amount of data accessed in response to a data access request to the data requested if the data access request is of non-well-behaved data.

7. A data processing system according to claim 6, further comprising:

well behaved memory;

non-well behaved memory mapped input/output devices; and wherein said well behaved memory and said non-well behaved memory mapped input/output devices are accessed by said data processor through said memory controller.

8. The data processing system according to claim 6, wherein said data processor and said memory controller are in a single integrated circuit.

9. A data processing system according to claim 6, wherein said memory controller receives guard information associated with access requests received from said processor; and wherein said memory controller prevents speculative memory accesses when the guard information indicates that the access request is of non-well behaved memory.

10. The data processing system according to claim 9, wherein said data processor provides to the memory controller guard information associated with each access request provided to said memory controller.

* * * * *